United States Patent
Abramson

[19]

[11] Patent Number: 6,046,991

[45] Date of Patent: Apr. 4, 2000

[54] TDM VARIABLE BROADCAST ENERGY TRANSMITTER

[75] Inventor: Norman Abramson, San Francisco, Calif.

[73] Assignee: Aloha Networks, Inc., San Francisco, Calif.

[21] Appl. No.: 08/835,420

[22] Filed: Apr. 9, 1997

[51] Int. Cl.$^7$ .................................................. H04B 7/185
[52] U.S. Cl. ...................... 370/318; 370/312; 370/342; 370/335; 370/441; 455/13.4; 455/38.3
[58] Field of Search .................................. 375/200, 206; 370/335, 342, 320, 441, 312, 318; 455/13.4, 38.3

[56] References Cited

U.S. PATENT DOCUMENTS

| | | | |
|---|---|---|---|
| 4,894,841 | 1/1990 | Martinino et al. | 375/206 |
| 5,274,667 | 12/1993 | Olmstead | 375/208 |
| 5,351,269 | 9/1994 | Schilling | 375/335 |
| 5,537,414 | 7/1996 | Takiyasu et al. | 370/347 |
| 5,566,165 | 10/1996 | Sawahashi et al. | |
| 5,745,480 | 4/1998 | Behtash et al. | 370/252 |

*Primary Examiner*—Hassan Kizou
*Assistant Examiner*—Mitchell Slavitt
*Attorney, Agent, or Firm*—James Creighton Wray; Meera P. Narasimhan

[57] ABSTRACT

Broadcasting of data packets from a hub station to many remote terminals in a two-way data network uses a spread spectrum time division multiplexed (TDM) channel. A channel in the other direction is a multiple access channel. To provide substantially equal energy per bit of the received signal at each of the remote terminals for maintaining reliability per bit at all terminals, the spreading factor of number of chips per bit is increased according to the distance of the remote terminal from the hub or the strength of the signal from the hub received by the remote terminal. The spreading factor or number of chips per bit may be changed according to the strength of the signal received by the hub from the remote terminal. Terminals positioned around the hub transmitter are located in regions arbitrarily determined by signal strengths, terrain, weather conditions or range. Fixed receivers in the closest region receive signals with the lowest spreading factor or number of chips per bit, and terminals in the furthest region or the region most affected by signal strength reduction receive signals from the hub with the highest spreading factor or number of chips per bit. Thus the energy per bit received by the most remote terminals is similar to the energy per bit received by the terminals which are closest to the hub and which receive strongest signals of data packets from the hub. Mobile remote terminals are provided with signals varying spreading factor and number of chips per bit according to the strength of the signal received from the mobile remote terminal.

26 Claims, 1 Drawing Sheet remote terminals        hub

TDM VARIABLE BROADCAST ENERGY TRANSMITTER

BACKGROUND OF THE INVENTION

The broadcasting of data packets from a single hub station to many remote receivers on a common channel occurs in many two way client server data networks. In some cases (for example the IS-95 CDMA digital cellular standard) the transmission uses a direct sequence spread spectrum form of transmission. Since the transmission from the hub station to the remote units is one to many, the communication channel in this direction may also be referred to as a spread spectrum time division multiplexed (TDM) channel. The channel in the other direction may be referred to as a multiple access channel.

SUMMARY OF THE INVENTION

The present invention is a new technique for packet transmission from the hub station.

This invention applies to a TDM hub station signal in a Spread ALOHA network or to any other kind of broadcast (one to many) transmission where a TDM format is used.

Since the hub transmitter operates in a broadcast channel rather than a multiple access channel, the design of the hub transmitter involves only a standard Time Division Multiplexed (TDM) format where packets addressed to individual users are embedded in a padded data stream consisting of either chips or bits.

In the channel from the hub to the remote terminals, the TDM data stream to each individual remote receiver can be spread to increase the energy per bit received by the remote terminal rather than for multiple access purposes. That raises the possibility of using a different spreading factor in the broadcast channel for each remote terminal.

The hub transmitter determines the amount of spreading required by each remote receiver, either from its location or from the received signal or by other means, and adjusts the spreading factor dynamically to provide a suitable value of energy per bit to each remote terminal. Thus some close-in receivers might be assigned a spreading factor of unity (a chip is the same as a bit), while others might be assigned a much higher spreading factor. Using this technique with a given hub station transmitter power, the maximum possible data rate can be obtained in the TDM channel in spite of a mix of different ranges to different receivers in the network.

By varying the spreading factor and number of chips per bit, the same reliability per bit is maintained for all terminals in the data network.

For a given amount of power out of the hub station the number of chips per bit (sometimes referred to as the spreading factor) will determine the energy per bit of the received signal at each of the remote terminals. In order to maintain the same reliability per bit for all terminals in such a channel the energy per bit of the received signal at each of the remote terminals should be the same. When all of the remote receivers in the network are at the same distance this can be accomplished by using the same number of chips per bit for each terminal. However in many networks the remote receivers are at different distances, and this results in different received values of the energy per bit, where the closest receivers have higher values and the further out receivers have lower values of the energy per bit.

In a time division multiplexed (TDM) communication channel where the spreading code used for data addressed to each of the receivers in a packet broadcasting spread spectrum TDM network is varied in order to change the number of chips per bit addressed to different users, it is possible to provide the same value of the energy per bit to all receivers in the network.

The terminals operated in the networks described in this disclosure could be either mobile or fixed wireless. In the case of fixed wireless terminals the spreading codes used for any given receiver would not change, but different receivers might use different spreading codes. Note that in such a system a different spreading code would not be assigned to each receiver, as in a CDMA system. Instead a given spreading code would be used for all receivers in a given class, such as all receivers within a specified range of received signal power.

In the case of mobile wireless terminals the spreading code for a given receiver might change as the strength of the received carrier from the hub changed. In this case it would be necessary to provide the hub with information on the relative strength of the received signal at the remote terminal. Both cases might start with a set of remote receivers where the spreading factor is one (i.e. no spreading, or a single chip for each bit), and the spreading could be increased successively for transmission to remote receivers which were further and further away, or for which the received signal is smaller and smaller for some other reason. This situation is shown in FIG. 2.

In FIG. 2 although all the regions are shown as circular, the disclosure is not limited to transmissions where the spreading gain is changed only because of the distance of transmission. The spreading gain in this invention might be varied because of signal strength differences (which might be affected by terrain and weather conditions as well as range), or it might be varied because of other considerations.

For example consider a hub transmitting data at the rate of one million chips per second, and assume all the packets to be transmitted are of length 1000. This example does not imply that this disclosure applies only to such systems or only to systems with a fixed packet length. Then if there are 5 packets to be transmitted to remote terminals on each of four regions and if the spreading factors in regions 1, 2, 3 and 4 are 1, 3, 7 and 15 respectively, then the transmission of these 20 packets will require a number of chips equal to $$5\times1000\times1+5\times1000\times3+5\times1000\times7+5\times1000\times15=130{,}000 \text{ chips}$$

or approximately 130 ms at the rate of 1 million chips per second.

These and other objects and features of the invention are apparent in the disclosure, which includes the above and ongoing written specification, with the claims and the drawings.

DETAILED DESCRIPTION OF THE PREFERRED EMBODIMENTS

Figure 1:
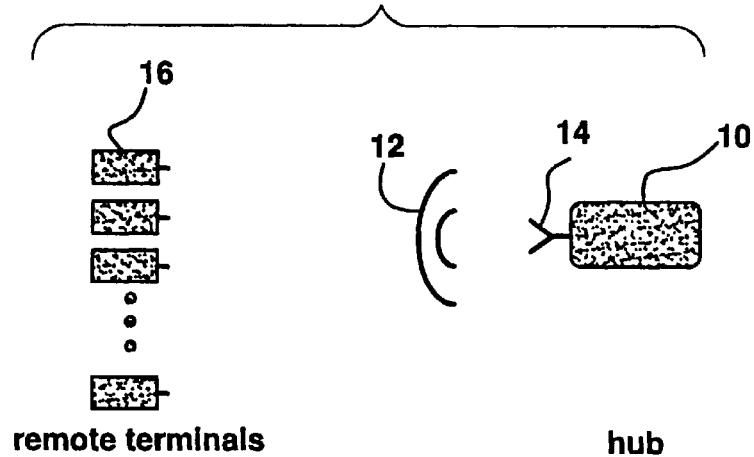
FIG. 1 is a schematic representation of a broadcast time division multiplexed (TDM) channel from a hub to remote terminals.

Referring to FIG. 1, a hub 10 broadcasts 12 via antenna 14 a number of signals in a spread spectrum time division multiplexed channel. The broadcast 12 is directed to a number of remote terminals 16. Each of the terminals 16 may be at a varied or variable distance or at a location which provides increased or decreased signal strength to be received by the remote terminals 16 from hub 10.

Figure 2:
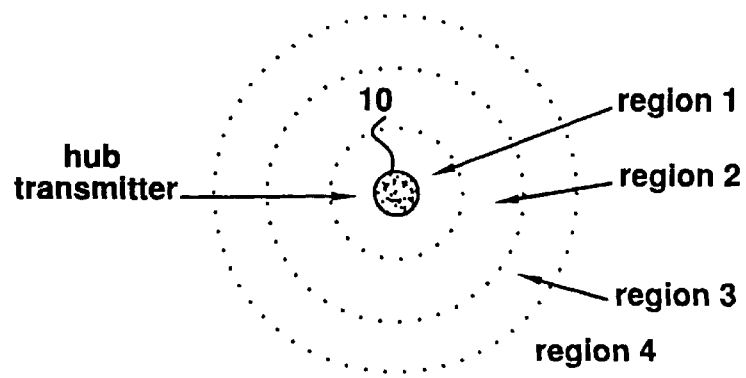
FIG. 2 is a schematic representation of a broadcast TDM channel with four regions in which remote terminals are located.

FIG. 2 schematically shows the hub transmitter 10 surrounded by regions 1, 2, 3 and 4, in which the remote terminals are located. The spreading factor is different for each region.

While the regions are shown to be circular, they represent areas of relative signal strength. In all probability for a hub transmitter, the actual lines separating regions 1–4 will be curved to show the effect of terrain and topography.

Figure 3:
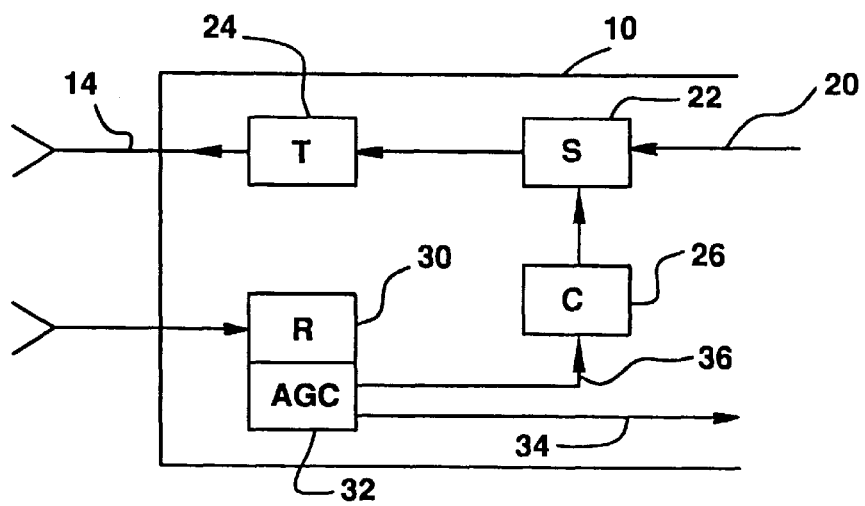
FIG. 3 schematically shows part of a hub receiver in which an automatic gain control (AGC) is used to sense strengths of incoming signals from a remote terminal in order to for adjust the spreading factor for the receiver of that remote terminal.

In FIG. 3 the hub 10 has a source 20 of digital bit signals. The bits are converted to chips by spreader 22 before reaching transmitter 24 which multiplies the chips and a carrier to broadcast signals to remote terminals via antenna 14. Controller 26 controls or selects the spreading factor in the spreader. The spreading factor may be, for example, one of four predetermined spreading factors for four different regions.

When a mobile terminal moves between regions or zones of relative hub-terminal signal reception strength, it may be useful to change the spreading factor in signals sent to that terminal.

A receiver 30 in hub 10 receives signals from a remote terminal. An automatic gain control 32 is part of the receiver. The automatic gain control has a main output 34 and a control output 36 which causes the controller 26 to maintain, increase or decrease the spreading factor, to one of the predetermined spreading factors. A fixed terminal may be programmed to receive signals with one spreading factor.

A mobile terminal may be programmed to receive signals with a range of spreading factors, or may be equipped to change spreading factors according to signals from the hub.

While the invention has been described with reference to specific embodiments, modifications and variations of the invention may be constructed without departing from the scope of the invention, which is defined in the following claims.

I claim:

1. The method of broadcasting data packets from a hub station to many remote terminals on a common channel, comprising broadcasting a direct sequence spread spectrum signal on the channel and selecting a spreading factor of a number of chips per bit in the signals for controlling the energy per bit of the signal received at each of the remote terminals in such a way that signals broadcast from the hub and addressed to terminals away from the hub have a larger spreading factor with a larger number of chips per bit, and signals addressed to terminals closer to the hub have lower spreading factors with fewer numbers of chips per bit, thereby delivering a substantially uniform energy per bit of the received signals at the terminals, and maintaining substantially the same reliability per bit for all terminals.

2. The method of claim 1, wherein when all of the remote terminals in a network are assumed to begin a same distance from the hub and the same spreading factor or number of chips per bit is used for each terminal.

3. The method of claim 1, wherein the remote terminals are at different distances from the hub, and different spreading factors and numbers of chips per bit are used for the terminals at different distances for maintaining similarity in received values of the energy per bit at different remote terminals.

4. The method of claim 1, wherein the broadcasting comprises broadcasting messages addressed to individual terminals on a spread spectrum time division multiplexed broadcast channel.

5. The method of claim 1, further comprising sensing strength of signals returned to the hub from the remote terminals and adjusting the spreading factor and number of chips per bit in signals from the hub addressed to the individual remote terminals based on signal strength from the terminals, terminals with higher signal strength receiving lower spreading factors and number of chips per bit, and terminals with lower signal strength receiving higher spreading factors and higher number of chips per bit.

6. The method of claim 1, further comprising control bits in packets of signals returned to the hub from the remote terminals and adjusting the spreading factor and number of chips per bit in signals from the hub addressed to the individual remote terminals based upon these control bits from the terminals.

7. The method of claim 1, further comprising varying spreading factor and number of chips per bit according to location of the remote terminals in regions surrounding the hub transmitter, broadcasting signals with lower spreading factors and lower numbers of chips per bit to terminals in a region closest to the hub transmitter, broadcasting signals with larger spreading factors and larger numbers of chips per bit to regions further from the hub transmitter, and broadcasting signals with intermediate spreading factors and intermediate numbers of chips per bit to terminals within intermediate regions.

8. The method of claim 7, further comprising starting with a spreading factor of one, no spreading, or a single chip per bit, for terminals in the region closest to the hub transmitter and increasing the spreading factor successively for transmissions to terminals which are further and further away from the hub or for which the received signal is smaller and smaller for some other reason.

9. The method of claim 7, further comprising defining the regions by variations in the strength of the signals received in those regions.

10. The method of claim 7, further comprising defining the regions by control bits in packets transmitted to the hub station from the remote stations.

11. The method of claim 7, further comprising varying spreading gain in the regions because of signal strength differences which are affected by terrain, structures, weather conditions and range.

12. The method of claim 7, further comprising varying spreading gain in the regions because of the control bits in packets transmitted to the hub station from the remote stations.

13. Apparatus for broadcasting data packets from a single hub station to many remote receivers in remote terminals, comprising a signal generator for generating data packets and addressing data packets to a remote terminal, a spreader connected to the generator for spreading the signal into a number of chips per bit, and a controller connected to the spreader for changing spreading factor and number of chips per bit.

14. The apparatus of claim 13, wherein the controller is connected to the generator for controlling the spreading factor according to address of the signal.

15. The apparatus of claim 13, wherein the controller is connected to the spreader for changing the spreader sequentially to use different spreading factors with different numbers of chips per bit.

16. The apparatus of claim 13, further comprising a receiver at the hub for receiving signals from the remote terminals, the receiver being connected to the controller for controlling spreading factor and number of chips per bit according to strength of the signal received from the remote terminals.

17. The apparatus of claim 13, further comprising a receiver at the hub for receiving signals from the remote terminals, the receiver being connected to the controller for controlling spreading factor and number of chips per bit according to control bits in the packets received from the remote terminals.

18. The apparatus of claim 13, wherein the controller maintains substantially equal energy per bit in signals received by the remote terminals by varying the spreading factor and number of chips per bit, thereby maintaining energy per bit of the received signal at each of the remote terminals substantially equal.

19. The method of controlling signal reception energy in spread spectrum signals, comprising controlling the spreading factor and changing a number of chips per bit in signals provided to a transmitter by increasing number of chips per bit and thereby increasing energy per bit in received signals, and decreasing number of chips per bit and thereby decreasing energy per bit in received signals.

20. The method of claim 19, further comprising selecting one of a number of predetermined chips per bit when increasing or decreasing chips per bit.

21. The method of claim 20, further comprising sensing signal strength and selecting according to the sensed signal strength.

22. The method of claim 20, further comprising sensing control bits in the packets received from the remote terminals and selecting the number of chips per bit according to the control bits in the packets received from the remote terminals.

23. The method of claim 19, further comprising sensing signal strength of signals received at the hub before changing the number of chips per bit.

24. The method of claim 19, further comprising sensing control bits in the packets received from the remote terminals before changing the number of chips per bit.

25. The method of claim 19, further comprising controlling the spreading factor by an output of an automatic gain control in a receiver at the hub.

26. The method of claim 19, further comprising controlling the spreading factor by sensing control bits in the packets received from the remote terminals.

\* \* \* \* \*